INVENTORS
ROBERT A. MYERS
CARL G. POWELL

BY John J. Goodwin
ATTORNEY

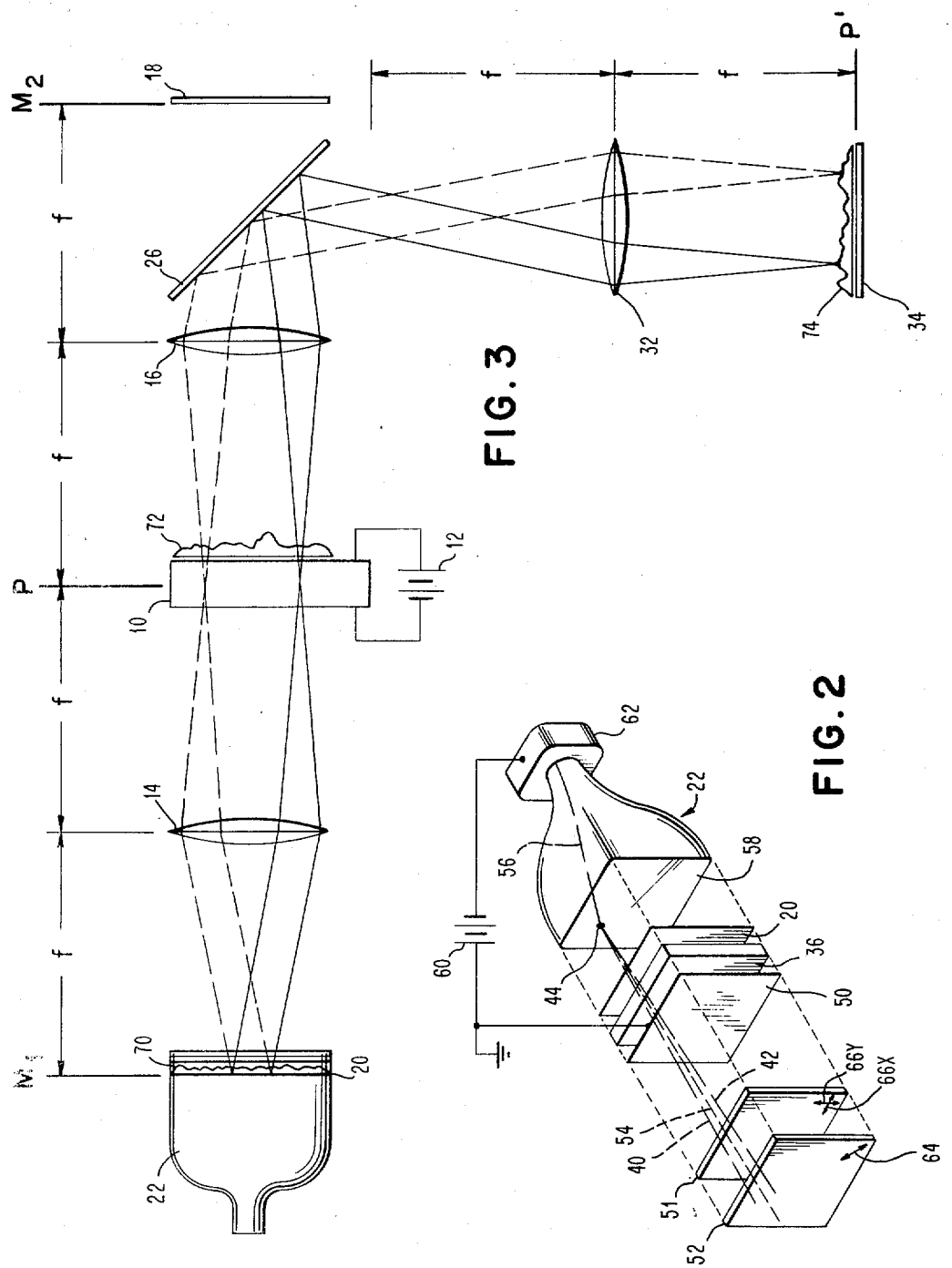

… … …

United States Patent Office 3,509,488
Patented Apr. 28, 1970

3,509,488
MULTIPATH CONJUGATE LASER
Robert A. Myers, New York, and Carl G. Powell, Yorktown Heights, N.Y., assignors to International Business Machines Corporation, Armonk, N.Y., a corporation of New York
Filed Jan. 13, 1967, Ser. No. 609,170
Int. Cl. H01s 3/00; G02q 1/28
U.S. Cl. 331—94.5                                    9 Claims

ABSTRACT OF THE DISCLOSURE

A conjugate laser cavity of the type having two end mirrors wherein each point on one end mirror has a conjugate point on the other mirror. The cavity includes additional optical paths coupled to the original cavity path in order to create additional mirror planes or equivalent object planes. The additional optical paths are produced by beam splitters located within the original cavity and permit the carrying out of functions such as binary logic, spatial filtering and multiple output coupling.

---

A conjugate concentric cavity laser is one in which the solid state or liquid active medium is placed in the center of a pair of spherical mirrors. The distances between the mirrors and the active medium are selected such that the two mirrors are mutually optically conjugated, that is, they occupy respectively an object and an image surface with respect to the active medium if it is considered to be a thick lens. By nature, the conjugate cavity of this type required spherically shaped mirrors so the cavity was generally radial. A flat field conjugate cavity laser is a similar device except that a pair of optical lenses are provided, one between each mirror and the active medium. The mirrors and the center of the active medium are spaced one focal length from the lenses so that mirrors can be made planar and parallel and a gaseous active medium may be used.

The flat field conjugate laser cavity can be operated in a plurality of modes and given modes can be singly or jointly selected and therefore it may be used as a logic device. It is also possible to introduce a phase object into the cavity so that the laser images the phase modulating object.

The present disclosure is directed to an improved version of the flat field conjugate laser wherein additional optical paths are provided and are coupled to that cavity and which can be employed to create additional mirror planes or equivalent object planes. Optical beam splitters are located within the original cavity and serve to provide the additional optical paths.

The following copending applications are cited since they contain related subject matter and serve to more fully explain certain elements described in this disclosure.

Copending application, Ser. No. 332,617, "Scanning Laser," filed Dec. 23, 1963, and now abandoned, in the name of R. V. Pole, and assigned to the present assignee shows a conjugate concentric cavity laser.

Copending application, Ser. No. 537,147 "Laser Projector," filed Mar. 24, 1966 now Patent No. 3,466,110 in the name of R. V. Pole et al. and assigned to the present assignee shows and describes a flat field conjugate cavity laser which further includes a phase object in the cavity such that the laser operates as a phase modulating device for projecting phase images.

Copending application, Ser. No. 412,814 "Apparatus for Controlling a Laser Beam," filed Nov. 20, 1964 now Patent No. 3,324,696 in the name of R. V. Pole et al. and assigned to the present assignee shows a conjugate cavity laser wherein a beam tube such as a CRT is located at one of the reflective surfaces of the cavity and the electron beam is employed to selectively switch the laser modes.

Field of invention

The present invention is in the optical arts and more particularly in the field of light amplification by stimulated emission.

Prior art

The most pertinent prior art related to the present invention is believed to be the aforementioned copending application Ser. No. 332,617.

In summary, the present invention is directed to a laser cavity having multiple optical paths which permits the carrying out of functions such as binary logic and spatial filtering plus mutliple output coupling.

The foregoing and other objects, features and advantages of the invention will be apparent from the following more particular description of a preferred embodiment of the invention, as illustrated in the accompanying drawings.

In the drawings:

FIG. 2 is a schematic drawing of a cathode ray-tube switching device used in the embodiment of FIG. 1.

FIG. 3 is a schematic of a portion of FIG. 1 showing the invention being used for spatial filtering.

Figure 1:
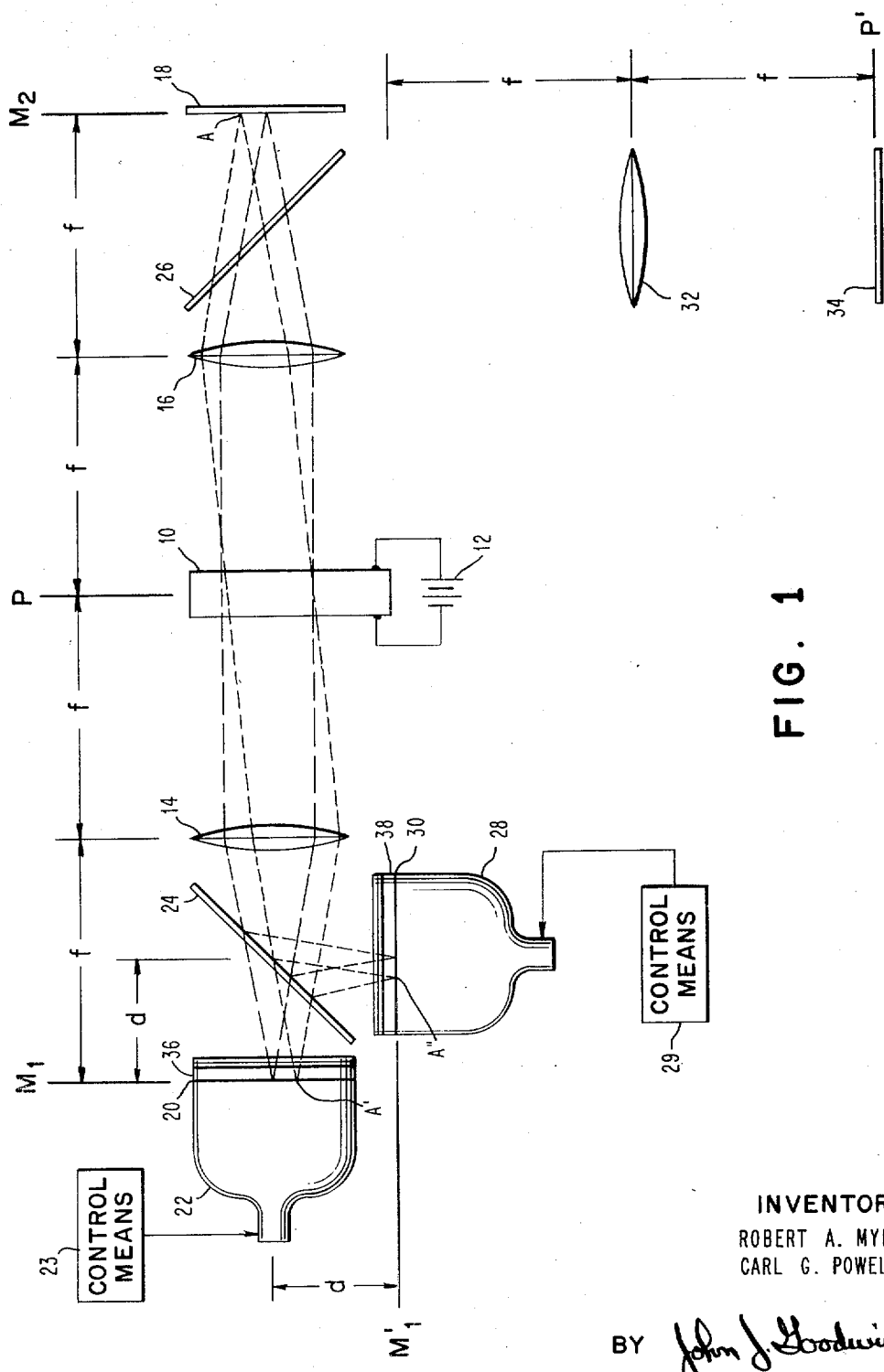
FIG. 1 is a schematic drawing of a multipath conjugate cavity laser according to the principles of the present invention.

Referring to FIG. 1 a flat field conjugate cavity laser is shown including an active medium represented diagrammatically by block 10 centered about the plane P. Active medium 10 may be any known material (e.g., mercury vapor) and is excited by a suitable pumping source such as electrical source 12. Two similar lenses 14 and 16 are located on either side of plane P at a distance equal to their focal length ($f$). On the other side of lens 16 a reflective surface referred to as a mirror 18 is located a distance ($f$) from lens 16 in plane $M_2$. On the other side of lens 14 at a distance ($f$) is located a second reflective surface 20 which is an integral part of a cathode ray tube switching device 22 which will be more fully explained in a discussion of FIG. 2.

As is well known, when the active medium 10 is pumped with energy from source 12, the active medium 10 will lase and light will be emitted. The light is reflected back and forth between the two reflective surfaces 18 and 20, and due to the arrangement of lenses 14 and 16 the plane $M_2$ is the conjugate of the plane $M_1$, as is illustrated by the broken lines in FIG. 1 which represent light rays. There are a great many separate light rays reflected between mirrors 18 and 20, each impinging on the mirrors at conjugate points.

A first beam splitter 24 is located in the cavity between mirror 20 and lens 14 and a second beam splitter 26 is positioned between mirror 18 and lens 16. Beam splitters 24 and 26 pass a percentage of the light entering from one direction and reflect the remaining percentage of the light at an angle, for example a right angle. Thus one portion of the light traveling from lens 14 toward mirror 20 passes through beam splitter 24 and falls on mirror 20 and the other portion of the light is reflected downward. Some of the light reflected from mirror 20 passes back through the beam splitter to lens 14 and the remainder is reflected out of the cavity and may be employed for other uses. The same is true for beam splitter 24.

A second cathode ray tube switching device 28 is located in the path of the light reflected downward from beam splitter 24. Cathode ray tube device 28 includes a reflective surface or mirror 30 which is normal to the light reflected from beam splitter 24 and is located in a plane M₁' which is a total distance (*f*) from lens 14 as measured along the central axis.

A third lens 32 is located in the path of (and normal to) the light reflected downward from beam splitter 26. Lens 32 is positioned a total distance (2*f*) from lens 16. A fourth reflective surface or mirror 34 is located in the optical path of lens 32 at a distance (*f*) behind lens 32 in plane P'. Thus two additional equivalent optical planes have been created. Plane M₁' containing mirror 30 is the optical equivalent of plane M₁. That is, plane M₂ is imaged onto planes M₁ and M₁'. Also, plane P is imaged onto plane P' by lenses 16 and 32. The significant aspect of the above is that operations or functions performed in the equivalent planes have a direct effect on the main cavity yet the operations or functions are preformed out of the cavity or "off line." Further, operations may be performed simultaneously in equivalent planes M₁ and M₁', or P and P' with the laser output being jointly determined by both operations.

Prior to describing the operation of the embodiment of FIG. 1, it is inecessary to explain in more detail the functions and operation of the cathode ray tube switching devices 22 and 28. Cathode ray tubes 22 and 28 are provided instead of the usual mirrors and must therefore include a reflective surface such as surface 20 of tube 22 and surface 30 of tube 28.

Electro-optic layers 36 (for tube 22) and 38 (for tube 28) are placed adjacent to this reflective surface. The layer responds to charges placed thereon by the electron beam of the cathode ray tube setting up a preferred axis at the point where the electron beam is positioned to create emission of a laser beam along this axis. The resolution of the laser beam is high due to the localized electro-optic effect occurring at the point where the electron beam is positioned.

An exploded view of the components of the cathode ray tube 22 is shown in FIG. 2. The separation between some of the components is exaggerated in order to provide a better illustration. Cathode ray tube 28 is identical to cathode ray tube 22 as will be described.

As previously mentioned, the optical elements are located so that points on the mirror 18 passing through beam splitter 24 are imaged onto the face of cathode ray tube 22. The pair of rays 40 and 42 (FIG. 2) illustrate the manner in which a point on mirror 18 (not shown) is imaged at a point 44 on the face of cathode ray tube 22. As stated, mirror 18 (FIG. 1) and face 36 lie in conjugate planes so that an infinite number of points on mirror 18 are imaged on the face of cathode ray tube 22.

A group of elements 20, 36, 50, 51, and 52 are shown in FIG. 1 between lens 14 and cathode ray tube 22. In the preferred embodiment elements 20, 36, and 50–52 are the target for the electron beam of cathode ray tube 22. Element 20 is a multi-layer dielectric reflector placed directly on the KDP layer 36. Reflector 20 performs the function of a mirror reflecting light emitted by laser element 10 (see FIG. 1) back along the same path. Oscillations are produced along an infinite number of axes, such as an axis 54 including point 44.

The other elements 36, 50, 51, and 52 are placed in the cavity in order to select a particular axis along which a laser beam is emitted. Element 36 may be a layer of potassium dihydrogen phosphate (KH₂PO₄), commonly referred to as KDP. The KDP layer 36 exhibits an electro-optic effect in the presence of an electric field. A full explanation of this effect is disclosed in commonly assigned copending application Ser. No. 391,854 entitled "Light Modulator" by Robert A. Myers et al. Element 50 may consist of a stannous oxide (SnO) coating on the KDP layer 36. The SnO layer 50 serves to set up a field across the KDP layer 36 by providing a path to ground.

The position of electric field is selected in the cathode-ray tube 22 which directs an electron beam against the face of the tube along a path such as path 56 which includes point 44. The reflector 20 is composed of a dielectric material or a mosaic of tiny metallic reflectors so that the charge is temporarily stored at the point where the beam strikes reflective layer 20. The SnO layer 50 is connected through a DC source 60 to a control element 62 of the cathode ray tube 22 which accelerates the electron beam. The SnO layer 50 is connected to the ground side of the DC source 60 in order to provide a reference potential for the field across the KDP layer 36 created by the electron beam. The location of the field across KDP layer 36 can be varied by altering the path of the electron beam in a conventional manner.

Element 52 is a polarizer which transmits light having an axis of polarization at 45° with respect to the vertical, the polarization axis being illustrated by an arrow 64. Element 51 is a fixed optical retardation plate which introduces a relative phase delay between horizontal and vertical polarization components of light passing therethrough. The two perpendicular components are illustrated in FIG. 2 by a pair of arrows 66Y and 66X. The KDP layer 36 is oriented so that its electrically induced principal axes are oriented at 45° to the polarizer 52.

In operation a pumping source 12 (FIG. 1) stimulates the laser element 10 (FIG. 1) so that light is produced along an infinite number of axes, such as axis 54 (FIG. 2). The light passing through polarizer 52 is oriented in a direction of arrow 64. Retardation plate 51 introduces a phase delay Δ as the light travels toward reflector 20. After the light is reflected from reflector 20 it undergoes a second phase delay Δ as it passes back through retardation plate 51. The polarizer 52 acts as an analyzer returning only a portion of the light back to laser element 16 (FIG. 1) due to the phase delay of the retardation plate 51.

In the case of a single cathode ray tube embodiment the intensity (I) of the beam returning to the beam splitter 24 (FIG. 1) is given by the expression:

$$I = I_0 \cos^2 (2\Delta) \qquad (1)$$

where $I_0$ is the intensity of light returning to the beam splitter 24 (FIG. 1) when no retardation plate 51 is employed.

The phase delay Δ introduced by the retardation plate 51 is selected so that the intensity (I) of the light returning to the laser element 10 (FIG. 1) is not sufficient to cause the laser to oscillate and emit its characteristic light in response to the pumping source 12 (FIG. 1). In order to obtain a laser beam, the phase delay Δ introduced by retardation plate 51 must be compensated for by the phase delay introduced by the KDP layer 36. Therefore with the electron beam directed along path 56, the KDP layer 36 introduces a compensating phase delay at point 44 which cancels a sufficient amount of the phase delay introduced by retardation plate 51 so that the intensity (I) of the light returning to laser element 10 (FIG. 1) is high enough to stimulate emission of a beam along axis 54. By changing the position of the electron beam on the face of the tube the axis along which compensate is achieved may be caused to vary a like manner. Therefore the laser may be caused to emit a beam along any axis selected by the cathode ray tube 22. When no electron beam strikes the tube face, emission of a laser beam is inhibited by the optical retardation plate 51. When more than one cathode ray tube is used, as shown in FIG. 1 the intensity (I) of the light returning to laser element 10 is the intensity of the light returning from both cathode ray tubes. That is, if two cathode ray tubes are used, each may produce portions of the total light intensity necessary to stimulate emission of a laser beam.

Cathode ray tube 28 of FIG. 1 operates in the same manner as described for tube 22 with the exception that the light ray paths are turned through an angle by the beam spiltter 24. For a further explanation of the operation of a cathode ray tube in a laser cavity see the previously mentioned copending application Ser. No. 412,814.

Referring again to FIG. 1, it is seen that the mirror surface 30 of the cathode ray tube 28 is located a distance $f$ from lens 14 and receives the light rays therefrom via beam splitter 24. Planes $M_1$ and $M_1'$ are equivalent so that points on plane $M_2$ are imaged onto both planes $M_1$ and $M_1'$ in the same manner.

Mirror 34 is coupled to the main cavity by beam splitter 26. Lens 32 is located a distance $2f$ from lens 16, and mirror 34 is located a distance $f$ from lens 32, therefore the plane P is imaged on plane P' of mirror 34. This is illustrated more clearly in FIG. 3 which is a partial schematic of FIG. 1.

Thus performing any operations in plane $M_1'$ is the substantial equivalent to performing such operations in plane $M_1$ at the same time and vice versa and performing any operation in plane P' is the substantial equivalent of performing such operation in plane P at the same time and vice versa.

The device in FIG. 1 is therefore a versatile laser cavity having multiple off line paths and conjugate off line planes which may be employed for a number of useful purposes, for example, performing parallel binary logic and spatial filtering.

Parallel binary logic will be described with reference to two functions, the AND function and the inclusive OR function. Cathode ray tube devices 22 and 28 are employed for the binary logic operations. It was stated that each point of mirror 18 in plane $M_2$ has equivalent points in both planes $M_1$ and $M_1'$ and the respective faces of tubes 22 and 28. Let some point A in plane $M_2$ on mirror 18 have equivalent points A' in plane $M_1$ and A" in plane $M_1'$ on the faces of tubes 22 and 28, respectively as shown in FIG. 1. When the electron beam of cathode ray tube 22 is directed (addressed) to point A' by a control signal from means 23 and the electron beam of cathode ray tube 28 is directed (addressed) to point A" by a control signal from means 29, the result is that the laser will lase in a selected mode such that the light beam produced will be directed onto point A of mirror 18 in plane $M_2$. If the electron beam of cathode ray tube 22 is directed to point A' in plane $M_1$ but the electron beam of cathode ray tube 28 is not directed to point A" in plane $M_1'$ there is insufficient stimulation to produce lasing and no beam is directed onto point A of mirror 18 in plane $M_2$. Obviously if neither electron beam in tubes 22 and 28 are directed to a point A' and A" respectively there will be no lasing action. Thus, if the condition of directing the laser beam onto the point A of mirror 18 is considered to represent the output binary "1" state and the lack of such a beam directed onto the point is considered to be the binary "0" state and the input binary "1" is represented by the condition of directing an electron beam of cathode ray tube 22 or 28 onto equivalent points on planes $M_1$ and $M_1'$, the lack of such beam being the input binary "0," then an "AND" function results and can be expressed as:

$$A' + \overline{A}'' = \overline{A}$$
$$\overline{A}' + A'' = \overline{A}$$
$$A' + A'' = A$$
$$\overline{A}' + \overline{A}'' = \overline{A}$$

or $$1+0=0$$
$$0+1=0$$
$$1+1=1$$
$$0+0=0$$

The above description related to a single point A in plane $M_2$ and its equilavent points A' and A" in planes $M_1$ and $M_1'$. It should be appreciated that an almost infinite number of points are contained on plane $M_2$ having equilavent pairs of points on planes $M_1$ and $M_1'$ which can be addressed by the cathode ray beams so that parallel logic operations can be performed by providing a plurality of point addresses to the cathode ray tubes and scanning in raster fashion by suitable signals from control means 23 and 29, or by using a plurality of electron beams in each tube. In addition, three-way "AND" and higher order coincidences can be provided for by using additional optical planes equivalent to $M_1$ and $M_1'$. This is accomplished by adding additional beam splitters in the cavities. The manner in which a cathode ray tube electron beam may be addressed and directed to a selected point on the face of the tube by suitable deflection signals applied to the deflection coils is well known and can be found in basic textbooks. Therefore, in FIG. 1, the control means 23 and 29 for tubes 22 and 28, respectively, have been left in schematic form.

Another logic function which may be performed with the device of the present invention as shown in FIG. 1 is the inclusive "OR." The inclusive "OR" function is specified as follows:

$$1+1=1$$
$$1+0=0$$
$$0+1=0$$
$$0+0=0$$

To perform this function the cathode ray tubes 22 and 28 operate in the same manner as in the case of the "AND" function. The threshold level of the laser element 10 is changed however so that lasing will occur when the electron beam of only one of the cathode ray tubes is directed onto its corresponding face. Thus, considering again points A, A', and A", if the beam of tube 22 is directed to point A' but tube 28 is off, lasing will occur at point A in plane $M_2$ (i.e., $1+0=1$). Likewise, if the beam of tube 28 is directed to point A" and tube 22 is off, lasing will occur at point A $(0+1=1)$. If the beams of tubes 22 and 28 are respectively directed to points A' and A", lasing will occur at point A $(1+1=1)$. However, if neither of the electron beams 22 and 28 are directed to points A' and A", no lasing will occur at point A $(0+0=0)$. As in the case of the "AND" function, a plurality of corresponding points on the faces of tubes 22 and 28 can be addressed and scanned to provide plural, parallel binary operations.

When the binary logic functions are performed, the output may be coupled out of the cavity at a convenient location, for example, at plane $M_2$, by known output coupling techniques as described in the copending applications.

Spatial filtering can be performed using the planes P and P' shown in FIG. 3. It is known that the light distribution in the plane P is the Fourier transform of the light in the plane $M_1$ and therefore the distribution of amplitude over the plane P is the complex spatial frequency spectrum of an object located in plane $M_1$. Plane $M_1$ is commonly referred to as the object plane and plane P is referred to as the frequency plane. By placing suitable masks in the frequency plane P it is possible to extract a specific spatial frequency at an output location.

A particularly useful application of the technique of spatial filtering is the identification of specific target patterns in a complex background. A particular target pattern, for example, a letter, will possess a particular spatial frequency spectrum. If such target is placed in the object plane $M_1$, and if a filter is placed in frequency plane P which will transmit only this spectrum, the resultant output will be a signal representative of the image of the letter only, the remainder of the information in the object field P having been suppressed by the filter in plane P. Spatial filtering as described finds uses in the automatic recognition of specific types of objects immersed in complex backgrounds, for example in aerial photointerpretation and microscopic examination. The specimen object would be located in the object plane $M_1$ and a series of filters would be selectively placed in the frequency plane P until the desired output is obtained.

The present invention teaches how one may simultaneously act on the frequency spectrum of an object (for example, in plane $M_1$) with two or more filters (in the planes P and P'), or with a single filter in the plane P' which does not require the laser light to pass through it.

Referring to FIG. 3, an object is placed in the plane $M_1$ (for example, by means of the beam tube assembly shown). For purposes of explanation the object 70 provided by the beam on the face of cathode ray tube 22 is represented by the element 70. Also a first phase filter 72 is placed in (or in the vicinity of) plane P and a second filter 74 (amplitude or phase or both) is placed in the plane P' on mirror 34. The filters 72 and 74 have been shown in exaggerated symbolic form for purposes of explanation. Because of the provided optical system, the plane P is imaged on plane P' as shown by the optical rays designated by the solid and dashed lines. The solid and dashed lines illustrate that the rays close on themselves. The use of both dashed and solid lines are employed merely to avoid confusion in viewing the diagram.

In FIG. 3 the Fourier transform of the object 70 in (or proximate to) plane $M_1$ is present on planes P' and P where it is filtered by the filters 72 and 74 to produce a useful output signal as described which may be coupled out at mirror 34 by well known techniques.

The advantage of the present device for spatial filtering is that filters may be provided off line at plane P'.

It is to be noted that the phase filter 72 in FIG. 3 was shown to be not exactly in plane P because the laser element 10 in the figure occupies such location. In practice the laser element 10 could be displaced so that phase filter 72 may be located precisely in plane P.

What has been described is a versatile conjugate cavity device having multiple light paths. The existence of the multiple paths enables the device to be used for a variety of functions such as binary optical logic and spatial filtering functions such as mask matching and matrix multiplication.

In the described embodiment two additional paths and their uses were described. Following the teaching of the present invention still further paths may be provided for additional applications by the use of additional beam splitters, lenses, etc.

The lenses in the described embodiment were shown to be identical and having the same focal length. If desired, different lenses with correspondingly different focal length spacings may be employed. Also, in the described embodiment the multiple paths were shown to be at right angles but in other embodiments different angles may be employed as desired.

While the invention has been particularly shown and described with reference to a preferred embodiment thereof, it will be understood by those skilled in the art that various changes in form and details may be made therein without departing from the spirit and scope of the invention.

What is claimed is:

1. A multiple path laser apparatus comprising a first laser cavity including a laser medium for producing laser light beams in a plurality of degenerate modes, first and second reflective surfaces positioned in said first laser cavity on either side of said laser medium for reflecting said laser light back and forth within said first laser cavity, first and second lenses positioned in said first laser cavity between said first and second reflecting surfaces, a beam splitting means positioned between said first and second reflective surfaces for coupling a portion of said laser light out of said first laser cavity in a first path, and a third reflective surface positioned outside said first laser cavity in said first coupled light path to reflect said light back into said first laser cavity, said first and second lenses positioned in said first cavity such that said second and third reflective surfaces are optically conjugate to said first reflective surface.

2. A multiple path laser apparatus according to claim 1 further including a first beam control means for producing and selectively directing an electron beam onto the back of said second reflective surface, a second beam control means for producing and selectively directing an electron beam onto the back of said third reflective surface, and first and second emission control means respectively proximate to said second and third reflective surface and respectively operated in response to the position of said electron beams of said first and second beam control means for selecting one of said plurality of laser beam modes.

3. A multiple path laser apparatus comprising a first laser cavity including a laser medium for producing laser light beams in a plurality of degenerate modes, first and second reflective surfaces positioned in said first laser cavity on either side of said laser medium for reflecting said laser light back and forth within said first laser cavity, a beam splitting means positioned between said first and second reflective surfaces for coupling a portion of said laser light out of said first laser cavity in a first path, a third reflective surface positioned outside said first laser cavity in said first coupled light path to reflect said light back into said first laser cavity, said third reflective surface being located in the image plane of a plane in said first cavity intermediate said first and second reflective means, and a third lens positioned in said first coupled light path between said beam splitting means and said third reflective surface for imaging said plane in said first laser cavity intermediate said first and second reflective means onto said third reflective surface.

4. A multiple path laser apparatus according to claim 3 including an object positioned approximately in the surface of said second reflective surface and a first filter positioned approximately in the surface of said third reflective surface for filtering given spatial frequencies of said spatial frequency transforms of said object in said surface of said third reflective surface.

5. A multiple path laser apparatus accordng to claim 4 including a second filter positioned intermediate said first and second reflective surfaces for further filtering said spatial frequency transforms of said object.

6. A multiple path laser apparatus comprising a first laser cavity including a laser medium for producing laser light beams in a plurality of degenerate modes, first and second reflective surfaces positioned in said first laser cavity on either side of said laser medium for reflecting said laser light back and forth within said first laser cavity, a first beam splitting means positioned between said first and second reflective surfaces for coupling a portion of said laser light out of said first laser cavity in a first path, a second beam splitting means positioned between first and second reflective surfaces for coupling a portion of said laser light out of said first laser cavity in a second path, a third reflective surface positioned outside said first laser cavity in said first coupled light path to reflect said light back into said first laser cavity, and a fourth reflective surface positioned outside said first laser cavity in said second coupled light path to reflect said light back into said first laser cavity.

7. A multiple path laser apparatus according to claim 6 further including first and second lenses positioned in said first laser cavity between said first and second reflecting surfaces, said first and second lenses positioned such that said second and third reflective surfaces are optically conjugate to said first reflective surface.

8. A multiple path laser apparatus according to claim 7 further including a third lens positioned in said second coupled light path between said second beam splitting means and said fourth reflective surface for imaging a plane in said first laser cavity intermediate said first and second reflective means onto fourth reflective surface.

9. A multiple path laser apparatus according to claim 8 wherein said first lens is positioned one focal length from said first reflective surface and two focal lengths from said second lens, and said second lens is positioned one focal length from said second reflective surface, and said third lens is positioned one focal length from said fourth reflective surface and three focal lengths from common focal surface intermediate said first and second lenses.

References Cited

UNITED STATES PATENTS 3,366,892  1/1968  Crowe _____ 331—94.5
3,405,370  10/1968  Kaminow _____ 331—94.5

OTHER REFERENCES

"Stabilized, Single-Frequency Output From A Long Laser Cavity" by P. W. Smith, IEEE Journal of Quantum Electronics, vol. QE–1, No. 8, November 1965, pp. 343–348.

"Wide Field Active Imaging" by R. A. Myers et al., IEEE Journal of Quantum Electronics, vol. QE–2, No. 8, August 1966, pp. 270–275.

RONALD L. WILBERT, Primary Examiner

P. K. GODWIN, JR., Assistant Examiner

U.S. Cl. X.R.

250—199; 332—7.51; 350—160, 290